(12) United States Patent
Portolani

(10) Patent No.: US 7,296,076 B1
(45) Date of Patent: Nov. 13, 2007

(54) MAINTAINING SESSION PERSISTENCE WITHOUT CLIENT-SUPPORTED COOKIES

(75) Inventor: Maurizio Portolani, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 618 days.

(21) Appl. No.: 10/279,272

(22) Filed: Oct. 23, 2002

(51) Int. Cl.
*G06F 15/16* (2006.01)
*G06F 15/173* (2006.01)

(52) U.S. Cl. ............ 709/227; 709/217; 709/228; 709/238

(58) Field of Classification Search ........ 709/227–228, 709/217, 238
See application file for complete search history.

(56) References Cited

U.S. PATENT DOCUMENTS

| | | | | |
|---|---|---|---|---|
| 6,098,093 | A * | 8/2000 | Bayeh et al. ............... | 709/203 |
| 6,473,802 | B2 | 10/2002 | Masters | |
| 6,772,333 | B1 * | 8/2004 | Brendel ..................... | 713/153 |
| 7,062,570 | B2 * | 6/2006 | Hong et al. ................ | 709/238 |
| 2001/0039586 | A1 * | 11/2001 | Primak et al. ............. | 709/228 |
| 2002/0040400 | A1 * | 4/2002 | Masters ..................... | 709/228 |
| 2002/0143981 | A1 * | 10/2002 | DeLima et al. ............ | 709/233 |
| 2003/0023744 | A1 * | 1/2003 | Sadot et al. ................ | 709/234 |
| 2003/0033520 | A1 * | 2/2003 | Peiffer et al. .............. | 713/153 |
| 2004/0024880 | A1 * | 2/2004 | Elving et al. .............. | 709/227 |
| 2004/0078341 | A1 * | 4/2004 | Steichen .................... | 705/64 |
| 2005/0010754 | A1 * | 1/2005 | Brendel ..................... | 713/153 |
| 2005/0021848 | A1 * | 1/2005 | Jorgenson ................. | 709/238 |

* cited by examiner

*Primary Examiner*—Nathan Flynn
*Assistant Examiner*—Joshua Joo
(74) *Attorney, Agent, or Firm*—Stolowitz Ford Cowger LLP

(57) ABSTRACT

Switch-implemented methods of maintaining persistence of a session between a client node and a server node are described. A response from the server node to a first request from the client node is received. The first request includes a uniform resource identifier (URI). The response includes a cookie that includes a random session identifier. The response also includes rewritten uniform resource locators (URLs) that include the URI and the session identifier. The session identifier from the cookie and the identity of the server node are stored. A second request is received from the client node. The second request includes a rewritten URI (when the client node does not support or enable the use of cookies). The session identifier from the rewritten URI is matched to the session identifier in memory to identify the associated server node. The second request can then be directed to the server node.

23 Claims, 3 Drawing Sheets

MAINTAINING SESSION PERSISTENCE WITHOUT CLIENT-SUPPORTED COOKIES

TECHNICAL FIELD

Embodiments of the present invention pertain to computer system networks. Specifically, embodiments of the present invention pertain to methods and devices for maintaining the persistence of a session between a client node and a server node.

BACKGROUND ART

When a client node and a server node engage in a session, it is advantageous for that session to be a persistent one. That is, over the duration of the session, it is desirable for the client node to remain in communication with the same server node in a cluster of servers. For example, when navigating a Web site that sells books, a user may make a selection of a particular book while viewing one of the Web pages. The user may move to other areas of the Web site before finalizing his/her selection. By maintaining a persistent session, the user will not have to re-enter his/her book selection while navigating the Web site.

Communications between client and Web server nodes utilize HyperText Transfer Protocol (HTTP) messages. HTTP is a stateless protocol without a built-in mechanism that would allow a server node to keep track of a client's previous actions. Consequently, different methods may be employed in order to maintain session persistence and thereby track the actions of each client.

One method typically used for maintaining session persistence involves the use of cookies. A unique, generally random, sequence of alphanumeric characters (e.g., a session identifier or session ID) is assigned by the server node to each session. The session ID is sent from the server node to the client node in response to an initial message from the client, and each subsequent message sent between the server and client nodes during a session includes the session ID for that session. The session ID is inserted into the cookie field of the HTTP header of each message sent during a session. Thus, when a server node receives a message from a client node, the server node can associate the message with a particular session.

However, there may be occasions in which the client node does not support cookies, or in which the use of cookies is disabled at the client end. In these cases, rewritten URLs (Uniform Resource Locators) may be used to track session persistence. A rewritten URL is generally of the form "URL?session=[session ID]." That is, a random sequence of alphanumeric characters, unique to the session, is appended by the server node to the end of the URLs associated with the Web site/page that was requested from the client node (these URLs are typically referred to as hyperlinks). In this case, the session ID appears in the data portion of the HTTP response (typically, HyperText Markup Language code). Each time a client node requests a particular Web page during a session, the session ID for that session is appended to the URI (Uniform Resource Identifier) of the requested Web page.

Typically, a provider of Web content does not use a single server node, but uses instead a number of "stateful" server nodes that are linked to a common device such as a content switch. A stateful server is used herein to describe a server node that does not share session information with other server nodes. Messages from a client node pass through the content switch and are directed to one of the stateful servers. The content switch generally uses some type of load balancing scheme to distribute incoming messages among the server nodes. With the use of intermediate devices such as content switches, the task of maintaining session persistence becomes more difficult because the intermediate device (e.g., the content switch) needs to be able to direct messages from a particular client node to the same server node over the course of a session.

To maintain session persistence, one option available to content switches and other intermediate devices is to use the Internet Protocol (IP) address provided by the source of the request (e.g., the IP address of the client node). Each time the content switch receives a message with the same source IP address, the content switch sends the message to the same server node. A problem with this approach is that many client nodes reside behind a number of different proxy devices (proxy servers or proxy caches). During a single session, messages from a client node may travel through different proxy servers. The IP address of the proxy server is used in lieu of the IP address of the client node, and thus messages from the same client may have different IP addresses. As a consequence, many different IP addresses may be used over the course of a single session.

Cookies can travel through a proxy server to a client node and back again, and thus provide a viable alternative to the use of IP addresses. However, in addition to the session ID, the server node also needs to include a server identifier (server ID) in the cookie. Typically, the server ID is a fixed string of characters uniquely identifying the server node. When the content switch receives a message from a client node that includes a cookie with the server ID, the content switch can recognize which of the servers should receive the message. A problem with this approach is that the server node needs to be modified so that it will add its server ID to cookies. Servers may be maintained by a number of different entities, and a number of different types of content switches may be in use. Thus, there is a possibility that not all servers will implement the scheme just described. There is also a possibility that servers will have to implement a number of different schemes depending on the schemes supported by the different types of content switches. In addition, those situations in which clients do not permit the use of cookies remain a problem.

To overcome those situations in which cookies are not permitted, the URL rewrite solution described above can be used, but with the modification that the server ID is appended to the URL in addition to the session ID. The content switch then functions in a manner similar to that just described for cookies. That is, when the content switch receives a client request containing a rewritten URL that includes both the session ID and the server ID, the switch can recognize which server node should receive the request. A problem with this solution is that the servers need to be modified so that they will include their respective server IDs in the rewritten URLs.

Another approach used by content switches is to hash the URL provided in a client request, and to direct the client message to a server node predicted from the hash. One problem with this approach is that it precludes the use of load balancing schemes, and so the distribution of traffic among the server nodes may not be satisfactorily managed. Another problem is that, during a single session, a client request containing one URI may go to one server and subsequent requests containing the same URI, plus the session ID, may go to a different server, with no sharing of session information among the servers.

Accordingly, a device and/or method that can maintain session persistence between a client node and a server node coupled through an intermediate device (such as a content switch) without the problems described above is desirable. The present invention provides a novel solution to these problems.

SUMMARY OF THE INVENTION

Various embodiments of methods and devices for maintaining persistence of a session between a client node and a server node are described. Generally speaking, the embodiments of the present invention are implemented by or on an intermediate node—such as a switch—that is situated between the client and server nodes.

According to one embodiment, a first request from the client node is received and forwarded to a server node. The first request includes a uniform resource identifier (URI). A response to the first request is received from the server node. The response includes a cookie that includes a random session identifier. The response also includes HTML (HyperText Markup Language) code with rewritten URLs that are based on the URI and the session identifier. The session identifier from the cookie and the identity of the server node are stored. A second request is received from the client node. The second request includes a rewritten URI (when the client node does not support or enable the use of cookies) that includes the session identifier. The session identifier provided with the rewritten URI is matched to the session identifier in memory to identify the associated server node. The second request can then be directed to the server node. In this manner, the persistence of the session between the client and server nodes is maintained.

Thus, according to the various embodiments of the present invention, session persistence can be achieved between servers and clients without client-supported cookies. Of note, server nodes do not have to be specially configured to support session persistence in the absence of cookies from client nodes. Various formats can be used to identify a session. Switches learn session information from the server nodes themselves, and then utilize this information to direct messages (requests) from clients to specific servers throughout each client-server session. Switches do not have to be preloaded with information identifying the various server nodes to which they provide service. Switches can also continue to use whatever load balance scheme they had been using.

These and other objects and advantages of the present invention will be recognized by those of ordinary skill in the art after having read the following detailed description of the preferred embodiments, which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving" or "storing" or "associating" or "matching" or "parsing" or "caching" or "comparing" or "adding to" or "locating" or the like, refer to the action and processes of a computer system (e.g., flowchart 400 of FIG. 4), or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
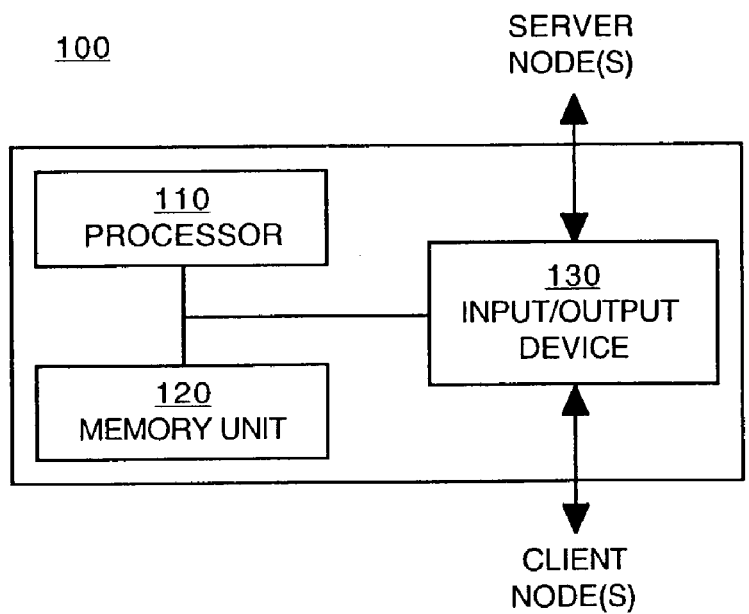
FIG. 1 is a block diagram of one embodiment of a device upon which embodiments of the present invention may be implemented.

FIG. 1 is a block diagram of one embodiment of a device 100 upon which embodiments of the present invention may be implemented. In one embodiment, device 100 is a switch, also referred to as a content switch. As will be seen in conjunction with FIG. 2 below, device 100 is generally a device that is situated in the communication path between client nodes and server nodes in a computer system network, and that routes traffic from the client nodes to the server nodes and vice versa. Device 100 allows a communication connection to be established for a session engaging a client node and a server node, and can terminate that connection when the session ends.

With reference to FIG. 1, in general, device 100 comprises a processor 110 for processing information and instructions, a memory unit 120 including a computer-usable storage medium for storing information and instructions for processor 110, and an input/output device 130, which provides a communication link between client nodes and server nodes in a computer system network. It is appreciated that device 100 may include elements in addition to or other than elements illustrated by FIG. 1.

Figure 2:
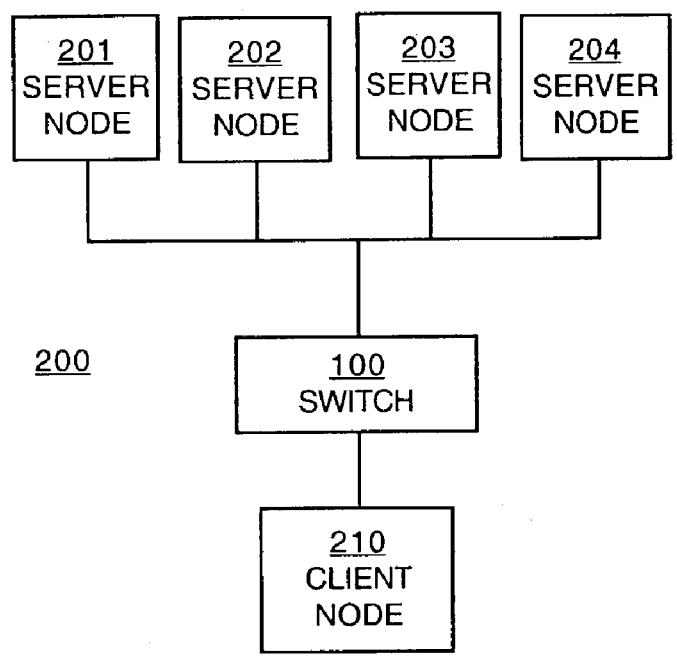
FIG. 2 is a block diagram showing a portion of a computer system network according to one embodiment of the present invention.

FIG. 2 is a block diagram showing a portion of a computer system network 200 according to one embodiment of the present invention. Network 200 may be a wired network or a wireless network, or may be a hybrid wired/wireless network. The portion of network 200 that is illustrated includes a number of server nodes 201, 202, 203 and 204 coupled to a switch 100, which in turn is coupled to client node 210. It is understood that any number of server nodes and client nodes may be present in actuality, and that there may be multiple switches. As mentioned above, switch 100 can represent any type of device that is situated in the communication path between client nodes and server nodes in a computer system network, that routes traffic from the client nodes to the server nodes and vice versa, and that has some capability to process and store information.

In the present embodiment, server nodes 201-204 represent a content server, a Web server, or the like, typically embodied as a familiar computer system. Client node 210 may likewise be embodied as a familiar computer system (laptop, desktop, or notebook), but may otherwise be embodied as a hand-held computer system (e.g., a personal digital assistant), a cell phone, or the like. In general, client node 210 provides a user with the capability to receive Web content and to convey selections to a server node. More generally, client node 210 provides a user with the capability to participate in a session with a server node, while server nodes 201-204 provide the capability to respond to client messages and likewise participate in a session with a client node.

Figure 3:
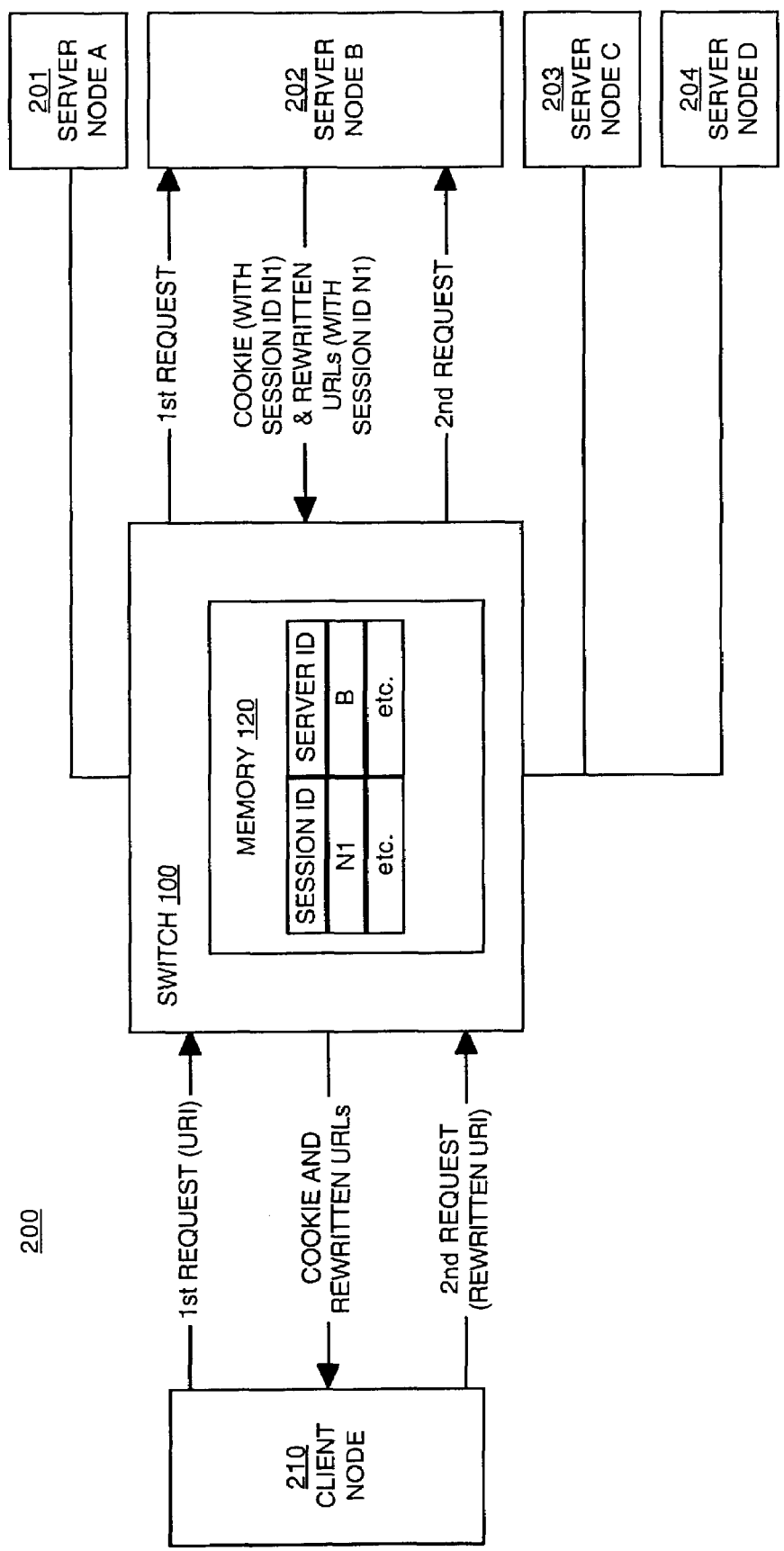
FIG. 3 is a data flow diagram showing an exchange of messages according to one embodiment of the present invention.

FIG. 3 is a data flow diagram showing an exchange of messages between client node 210 and one of the server nodes 201-204 via switch 100 according to one embodiment of the present invention. The messages may be sent using wired or wireless connections or a combination thereof.

In the present embodiment, to initiate a session with a server node, client node 210 sends a first message or request that is received by the switch 100. This first request includes a Uniform Resource Identifier (URI) identifying a particular resource (e.g., a Web site) of interest. It is understood that the first request, as well as the other messages discussed herein, may include additional information beyond that described herein.

Terms such as "URI" and "URL" (Uniform Resource Locators) are known in the art. According to HyperText Transfer Protocol (HTTP), for example, a URL may be of the form "http://abcd.com/," in which case the URI is "abcd.com/."

In the present embodiment, switch 100 will direct the first message from client node 210 to one of the server nodes, in this case to server node 202 (server node B). Typically, at this point, the decision as to which of the server nodes will receive the initial request from client node 210 is made based on a load balancing scheme implemented by switch 100. Various load balancing schemes may be used; the present invention, in its various embodiments, does not interfere with the load balancing scheme implemented by the switch 100.

Server node 202, to maintain a persistent session with client node 210, will assign a session identifier (session ID) to the session. Various formats can be used for the session ID. Each of the server nodes 201-204 can use different formats for the session ID. In one embodiment, the session ID is a random sequence of alphanumeric characters (e.g., a random number) or other types of characters. For the exemplary embodiment illustrated by FIG. 3, a session ID of "N1" is used.

However, server node 202 does not know whether or not client node 210 accepts or supports cookies. Therefore, in the present embodiment, server node 202 will respond to the initial request from client node 210 with both a cookie and with rewritten URLs. According to the present embodiment, both the cookie and the rewritten URLs include the session ID (N1) assigned to the session.

In the present embodiment, switch 100 receives the cookie and the rewritten URLs from server node 202. The switch 100 stores (e.g., caches) in memory 120 the session ID (N1) for the ongoing session. In one embodiment, the switch 100 also stores in memory an identifier associated with the server node 202 (referred to as the "server ID"). The server ID may be any identifier uniquely associated with server node 202 and, as such, sufficient for distinguishing server node 202 from the other server nodes coupled to switch 100.

Various schemes may be employed by switch 100 to store the session ID and the associated server ID. In one embodiment, switch 100 stores the server ID in a lookup table (LUT) that is indexed using the session ID.

Thus, according to the present embodiment of the present invention, switch 100 learns session information (e.g., the session ID) from the server nodes themselves. As will be seen, switch 100 can then utilize this information to direct messages (requests) from clients to specific servers throughout each client-server session.

Note that, in the present embodiment, it is not necessary for server node 202 to provide a server ID to the switch 100. Switch 100 recognizes which of the server nodes was sent the initial request from client node 210, and/or recognizes which of the server nodes has provided the response to the request from client node 210. In one embodiment, using either or both of these pieces of knowledge, switch 100 can assign a unique identifier to server node 202 (as well as to the other server nodes) without receiving a server ID from the responding server node. Thus, server nodes 201-204 do not have to be specially configured with a unique server ID, nor do they have to be configured to provide their respective server IDs to switch 100. Similarly, it is not necessary for switch 100 to be preloaded with the server IDs for the server nodes 201-204 coupled to the switch. Note, however, that should the server nodes 201-204 be configured to provide a unique server ID to switch 100, or should this information be preloaded onto switch 100, the present invention in its various embodiments can utilize this information and still function as described herein.

At this point in the exchange of messages illustrated by FIG. 3, it would still not have been determined whether or not client node 210 supports the use of cookies, and so switch 100 forwards both the cookie and the rewritten URLs to client node 210. Should client node 210 support the use of cookies, a subsequent message (e.g., a second request) sent during the ongoing session by client node 210 would include the cookie, in the cookie field of the HTTP header, for example. Switch 100 would then forward the second request to the server identified by the cookie (e.g., server node 202).

Of particular interest herein is the case in which client node 210 does not support the use of cookies. In this case, the cookie field of the HTTP header will be empty in the second request (and subsequent messages) from client node

210. The second request (and subsequent messages) from client node 210 will instead utilize a rewritten URI based on the rewritten URLs received from server node 202.

According to the various embodiments of the present invention, switch 100 will match the session ID from the rewritten URI (from client node 210) to a session ID stored in memory 120. In one embodiment, switch 100 parses the rewritten URI to read the session ID. Once the session ID is obtained by switch 100 from the rewritten URI, the server node associated with that session ID can be determined based on the information in memory 120, and switch 100 can forward the second request (and subsequent session messages) to server node 202.

Figure 4:
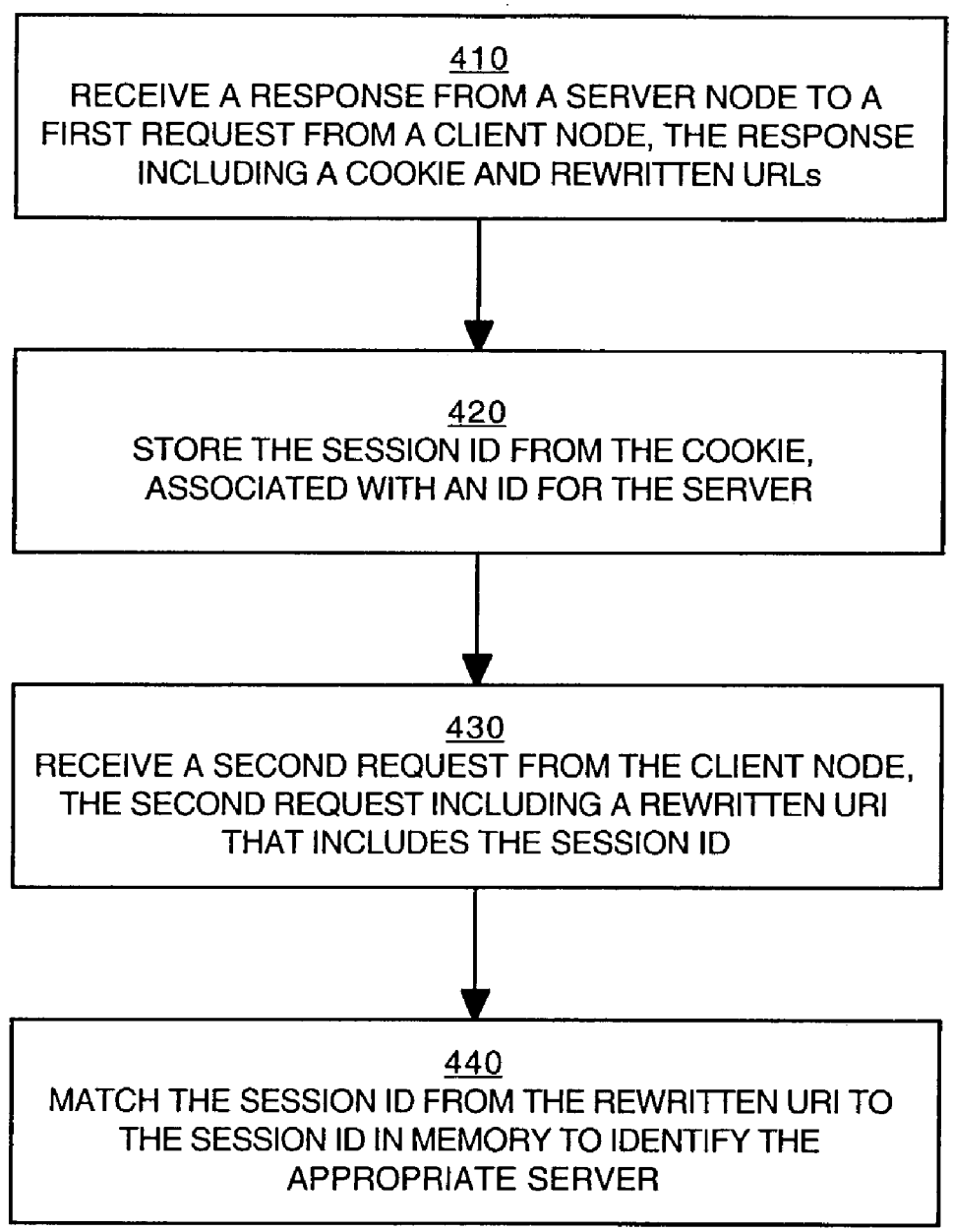
FIG. 4 is a flowchart of a method for maintaining session persistence between networked computer systems according to one embodiment of the present invention.

FIG. 4 is a flowchart 400 of a method for maintaining session persistence according to one embodiment of the present invention. Although specific steps are disclosed in flowchart 400, such steps are exemplary. That is, embodiments of the present invention are well suited to performing various other steps or variations of the steps recited in flowchart 400. It is appreciated that the steps in flowchart 400 may be performed in an order different than presented, and that not all of the steps in flowchart 400 may be performed. In one embodiment, the method of flowchart 400 is implemented by a device, such as switch 100, that resides between a client node and a server node as illustrated by FIGS. 2 and 3, above.

In step 410 of FIG. 4, in the present embodiment, a response from a server node to a first request from a client node is received. In one embodiment, the response from the server node includes a cookie that includes a session ID. In this embodiment, the response from the server node also includes rewritten URLs that also include the session ID (specifically, the same session ID). In one embodiment, the session ID is randomly assigned.

In step 420, in the present embodiment, the session ID from the cookie provided by the server node is stored in memory. The session ID may be cached in a cache memory or stored as an entry in a lookup table. Associated with the session ID in memory is a server ID corresponding to the server node that responded to the first request from the client node. In one embodiment, the server ID is not provided by the server node. That is, for example, knowledge of the source of the session ID can be used to determine a unique server ID for that source. Basically, the switch (or other such device between the client and server nodes) knows which server node the switch directed the first client request to, or recognizes which server node provided the response to the first client request, and can use any of this information to determine a unique server ID to associate with the session ID.

In step 430, in the present embodiment, a second request is received from the client node. Of particular interest is the case in which the client node does not support the use of cookies. Thus, in the present embodiment, the second request will not have the session ID in its cookie field, and instead will include a rewritten URI that includes the session ID.

In step 440, in the present embodiment, the session ID from the rewritten URI provided by the second client request is compared to the session ID that was taken from the cookie that was previously received from the server node and stored in memory (step 410). In one embodiment, the second client request is parsed so that the session ID can be read.

It is likely that the memory will actually include a number of session IDs for a number of ongoing, parallel sessions. In that case, the session ID from the second request can be located in memory by searching the listing of session IDs, until a match between the session ID in the second request is found.

The server ID associated with the session ID provided by the second client request is thus identified, and the second client request can be forwarded to the appropriate server node, thereby maintaining a persistent session between a client node and a server node. Steps 430 and 440 can be repeated as necessary for each subsequent client message.

In summary, embodiments of the present invention provide methods and devices for maintaining persistence of a session between a client node and a server node. Generally speaking, the embodiments of the present invention are implemented by or on an intermediate node—such as a switch—that is situated on the communication path between the client and server nodes.

According to the various embodiments of the present invention, session persistence can be achieved between servers and clients without client-supported cookies. Of note, in the absence of cookies from client nodes, server nodes do not have to be specially configured to support session persistence with static fields in the session ID. Various formats can be used to identify a session. Switches learn session information from the server nodes themselves, and then utilize this information to direct messages (requests) from clients to specific servers throughout each client-server session. Switches do not have to be preloaded with information identifying the various server nodes to which they provide service. Switches can also continue to use whatever load balance scheme they had been using.

Embodiments of the present invention are thus described. While the present invention has been described in particular embodiments, it should be appreciated that the present invention should not be construed as limited by such embodiments, but rather construed according to the below claims.

What is claimed is:

1. A method comprising:
 receiving a first request from a client at an intermediary device, the first request to initiate a session between the client and at least one of a plurality of servers, the first request having a unique resource identifier to identify at least one resource associated with one or more of the plurality of servers;
 directing a message corresponding to the first request to at least one of the plurality of servers according to the unique resource identifier;
 receiving a response to the message from a server of the at least one of the plurality of servers at the intermediary device, the response including a cookie having a session identifier assigned by the server to identify the session initiated responsive to the first request, and a rewritten uniform resource locator determined from the unique resource identifier and the session identifier;
 generating a server identifier at the intermediary device responsive to the first request, the server identifier to uniquely identify the server responsive to directing the message corresponding to the first request to the server, wherein the response to the message from the server does not include the server identifier;
 storing in memory the session identifier from the cookie and the server identifier and associating the session identifier with the server identifier;
 receiving a second request from the client, the second request including a rewritten unique resource identifier having the session identifier, wherein the second request does not include the cookie having the session identifier;

matching the session identifier from the rewritten unique resource identifier to the session identifier in the memory and looking up the server identifier associated with the session identifier to identify the server associated with the second request; and forwarding the second request to the server.

2. The method of claim 1 wherein said first request and said second request are HyperText Transfer Protocol (HTTP) requests.

3. The method of claim 1 wherein said session identifier is randomly assigned.

4. The method of claim 1 wherein said session identifier is absent from a cookie filed of said second request.

5. The method of claim 1, wherein said memory comprises a lookup table comprising servers indexed using session identifiers.

6. The method of claim 1 wherein said matching comprises: parsing said rewritten unique resource identifier in said second request to read said session identifier.

7. A device coupled between a client node and a plurality of server nodes, said device comprising:

a memory unit; and a processor coupled to said memory unit, said processor for maintaining persistence of a session between said client node and a server node, and adapted to:

receive a first request from said client node at the device, the first request to initiate the session between the client node and at least one of a plurality of server nodes, the first request having a unique resource identifier to identify at least one resource associated with one or more of the plurality of server nodes;

direct a message corresponding to the first request to at least one of the plurality of server nodes according to the unique resource identifier;

receive a response to the message from the server node at the device, the response including a cookie having a session identifier assigned by the server node to identify the session initiated responsive to the first request, and a rewritten resource identifier and the session identifier;

generate a server identifier at the device responsive to the first request, the server identifier to uniquely identify the server node responsive to directing the message corresponding to the first request to the server node, where the response to the message from the server node does not include the server identifier;

cache in said memory unit said session identifier from said cookie, wherein said cache comprises associating said session identifier with said unique server identifier;

receiving a second request from the client node, the second request including a rewritten unique resource identifier having the session identifier, wherein the second request does not include the cookie having the session identifier;

compare the session identifier from the rewritten unique resource identifier to the session identifiers in the memory unit and looking up the server identifier associated with the session identifier to identify the server node associated with the second request; and forwarding the second request to the server node.

8. The device of claim 7 wherein said first request and said second request are HyperText Transfer Protocol (HTTP) requests.

9. The device of claim 7 wherein said session identifier is randomly assigned.

10. The device of claim 7 wherein said session identifier is absent from a cookie field of said second request.

11. The device of claim 7 wherein said memory unit comprises a lookup table comprising server nodes indexed using session identifiers.

12. The device of claim 7 wherein said matching comprises: parsing said rewritten unique resource identifier in said second request to read said session identifier.

13. The device of claim 7 wherein said device comprises a switch coupling said server node and said client node.

14. A computer-usable storage medium having computer-readable program coded embodied therein for causing at least one processor coupled between a client and a plurality of servers to perform a method of maintaining persistence of a session between said client and a server, said method comprising:

receiving a first request from the client at an intermediary device, the first request to initiate a session between the client and at least one of the plurality of servers, the first request having a unique resource identifier to identify at least one resource associated with one or more of the plurality of servers;

directing a message corresponding to the first request to at least one of the plurality of servers according to the unique resource identifier;

receiving a response to the message from a server of the at least one of the plurality of servers at the intermediary device, the response including a cookie having a session identifier assigned by the server to identify the session initiated responsive to the first request, and a rewritten uniform resource locator determined from the unique resource identifier and the session identifier, generating a server identifier at the intermediary device responsive to the first request, the server identifier to uniquely identify the server responsive to directing the message corresponding to the first request to the server, wherein the response to the message from the server does not include the server identifier;

adding to memory an entry associating the session identifier from the cookie with the server identifier;

receiving a second request from the client, the second request including a rewritten unique resource identifier having the session identifier, wherein the second request does not include the cookie having the session identifier;

locating the entry in memory that corresponds to the session identifier from the rewritten unique resource identifier and looking up the server identifier associated with the session identifier to identify the server associated with the second request; and forwarding the second request to the server node.

15. The computer-readable storage medium of claim 14 wherein said first request and said second request are HyperText Transfer Protocol (HTTP) requests.

16. The computer-usable storage medium of claim 14 wherein said session identifier is randomly assigned.

17. The computer-usable storage medium of claim 14 wherein said session identifier is absent from a cookie field of said second request.

18. The computer-usable storage medium of claim 14 wherein said memory comprises a lookup table comprising servers indexed using session identifiers.

19. The computer-usable storage medium of claim 14 wherein said computer-readable program code embodied therein causes said one or more processors to perform said method comprising: parsing said rewritten unique resource identifier in said second request to read said session identifier.

20. A system comprising:
means for receiving a first request from a client at an intermediary device, the first request to initiate a session between the client and at least one of a plurality of servers, the first request having a unique resource identifier to identify at least one resource associated with one or more of the plurality of severs;
means for directing a message corresponding to the first request to at least one of the plurality of servers according to the unique resource identifier;
means for receiving a response to the message from a server of the at least one of the plurality of servers at the intermediary device, the response including a cookie having a session identifier assigned by the server to identify the session initiated responsive to the first request, and a rewritten uniform resource identifier determined from the unique resource identifier and the session identifier;
means for generating a server identifier at the intermediary device responsive to the first request, the server identifier to uniquely identify the server responsive to directing the message corresponding to the first request to the server, wherein the response to the message from the server does not include the server identifier and wherein the intermediary device is not preloaded with the server identifier for the at least one of the plurality of servers;
means for storing the session identifier from the cookie and the server identifier and associating the session identifier with the server identifier;
means for receiving a second request from the client, the second request including a rewritten unique resource identifier having the session identifier, wherein the second request does not include the cookie having the session identifier;
means for matching the session identifier from the rewritten unique resource identifier to the session identifier in the memory and looking up the server identifier associated with the session identifier to identify the server associated with the second request; and
forwarding the second request to the server node.

21. The system of claim 20 wherein said first request and said second request are HyperText Transfer Protocol (HTTP) requests.

22. The system of claim 20 wherein said means for storing comprises a lookup table comprising servers indexed using session identifiers.

23. The system of claim 20 further comprising: means for parsing said rewritten unique resource identifier in said second request to read said session identifier.

* * * * *

UNITED STATES PATENT AND TRADEMARK OFFICE
CERTIFICATE OF CORRECTION

PATENT NO. : 7,296,076 B1
APPLICATION NO. : 10/279272
DATED : November 13, 2007
INVENTOR(S) : Maurizio Portolani It is certified that error appears in the above-identified patent and that said Letters Patent is hereby corrected as shown below:

At column 8, line 56, please delete "identifier," and insert -- identifier; --.

At column 9, line 16, please delete "filed" and insert -- field --.

At column 9, line 16, please delete "claim 1," and insert -- claim 1 --.

At column 9, line 42, please delete "resource identifier and the session identifier;" and insert -- uniform resource locator determined from the unique resource identifier and the session identifier; --.

At column 10, line 14, please delete "coded" and insert -- code --.

At column 10, line 21, please delete "plurality of" before the word servers.

At column 10, line 34, please delete "identifier," and insert -- identifier; --.

At column 10, line 54, please delete "readable" and insert -- usable --.

At column 11, line 20, please delete "identifier" and insert -- locator --.

Signed and Sealed this

Twenty-second Day of December, 2009

David J. Kappos
*Director of the United States Patent and Trademark Office*